(12) United States Patent
Edwards

(10) Patent No.: US 6,230,340 B1
(45) Date of Patent: May 15, 2001

(54) TRUCK BED COT SYSTEM

(76) Inventor: Bruce Edwards, 448 Ignacio Blvd. #192, Novato, CA (US) 94949

( * ) Notice: Subject to any disclaimer, the term of this patent is extended or adjusted under 35 U.S.C. 154(b) by 0 days.

(21) Appl. No.: 09/444,005

(22) Filed: Nov. 20, 1999

(51) Int. Cl.⁷ .................................................. A47C 67/64
(52) U.S. Cl. ........................... 5/118; 5/110; 5/123; 296/3; 296/170; 296/37.6
(58) Field of Search ................ 296/3, 170, 37.6, 296/19, 20; 5/118, 110, 112, 119, 122, 123; 224/402, 403

(56) References Cited

U.S. PATENT DOCUMENTS

| | | |
|---|---|---|
| 928,317 | 7/1909 | Menten . |
| 1,151,495 * | 8/1915 | Menten ..................................... 5/122 |
| 1,389,073 * | 8/1921 | Schlosser ................................. 5/118 |
| 1,478,358 * | 12/1923 | Crain ........................................ 5/118 |
| 1,620,346 * | 3/1927 | Harper ..................................... 5/118 |
| 1,676,987 * | 7/1928 | Line ......................................... 5/118 |
| 1,732,520 * | 10/1929 | Leatherman ........................ 5/118 X |
| 2,756,441 * | 7/1956 | Shannon ................................... 5/118 |
| 2,970,323 * | 2/1961 | Griffith et al. ........................... 5/118 |
| 3,353,194 | 11/1967 | Matson ..................................... 5/118 |
| 3,524,673 | 8/1970 | Cramer ..................................... 296/23 |
| 4,679,840 * | 7/1987 | Fry et al. .................................. 5/118 |
| 4,807,314 * | 2/1989 | Fry et al. .................................. 5/118 |
| 5,170,521 * | 12/1992 | Light ........................................ 5/118 |

FOREIGN PATENT DOCUMENTS

| | | | |
|---|---|---|---|
| 128387 * | 7/1948 | (AU) ......................................... 5/123 |
| 91684 * | 9/1961 | (DK) ......................................... 5/110 |
| 781373 * | 5/1935 | (FR) .......................................... 5/112 |
| 2337641 * | 8/1977 | (FR) .......................................... 5/118 |
| 380478 * | 5/1940 | (IT) ........................................... 5/110 |

* cited by examiner

*Primary Examiner*—D. Glenn Dayoan
*Assistant Examiner*—Patricia Engle
(74) *Attorney, Agent, or Firm*—Goldstein & Canino

(57) ABSTRACT

A camper cot assembly, for use on a pick-up truck having a bed having bed sides extending upward from the bed, comprising a frame and a sturdy fabric covering extending between the frame. The frame comprises a pair of main members which extend between the bed sides, and a pair of stabilizing supports which extend between the main members at the ends thereof. The stabilizing supports prevent the main members from sliding toward each other when a person lays upon the fabric covering. The main members are configured so as to allow the cot assembly to rest upon the bed sides with or without a camper shell also installed thereupon.

2 Claims, 4 Drawing Sheets

TRUCK BED COT SYSTEM

BACKGROUND OF THE INVENTION

The invention relates to a truck bed cot system. More particularly, the invention relates to a system for allowing a person to sleep on a cot-like bed, utilizing the bed sides of a pickup truck for support.

Sleeping outdoors is sometimes done for the sake of fun, and other times done out of necessity. Regardless of the purpose, anyone who chooses to sleep outdoors still desires comfortable accommodations when doing so.

A variety of outdoor bedding systems have been devised which focus upon allowing a person to sleep comfortably upon a hard surface, such as the ground itself. These bedding systems focus upon padding of various kinds, including foam, air mattresses, and the like. The problem with most of these systems is that they require considerable storage space, and require either time or electricity to set up.

A compact, yet extremely comfortable sleeping solution is the hammock. Hammocks consist of a sturdy fabric which is suspended above the ground by ropes. Hammocks tend to be extremely comfortable, because by their nature, they evenly distribute the weight across the user. However, hammocks require several sturdy vertical objects nearby to secure the supporting ropes.

Certain cots have been devised which attempt to mimic the comfort of a hammock while eliminating the need for supporting ropes. Such cots employ rigid frames which suspend a sturdy fabric from the edges thereof. The problem with these cots for most camping applications is the problem of storing the cots when not in use. When camping, storage space is at a premium. In addition, when one wishes to carry sleeping provisions to meet the occasional need, storing bulky sleeping provisions for those few occasions quickly becomes rather inconvenient.

While these units may be suitable for the particular purpose employed, or for general use, they would not be as suitable for the purposes of the present invention as disclosed hereafter.

SUMMARY OF THE INVENTION

It is an object of the invention to produce a cot system which is particularly well suited for use across the bed of a pick-up truck. Accordingly, the cot employs a pair of parallel main members which extend between the bed sides of the truck, and rest thereupon.

It is another object of the invention to provide a cot system which is stable when in use upon the pick-up truck bed sides. Accordingly, a pair of stabilizing bars extend between the parallel main members to prevent the cut from collapsing inward under the weight of a user.

It is a further object of the invention to provide a cot system which is easily deployed for use, and is easily and compactly stored when not in use. Accordingly, the configuration of the cot system allows quick set-up and breakdown, and requires little space when not in use.

The invention is a camper cot assembly, for use on a pick-up truck having a bed having bed sides extending upward from the bed, comprising a frame and a sturdy fabric covering extending between the frame. The frame comprises a pair of main members which extend between the bed sides, and a pair of stabilizing supports which extend between the main members at the ends thereof. The stabilizing supports prevent the main members from sliding toward each other when a person lays upon the fabric covering. The main members are configured so as to allow the cot assembly to rest upon the bed sides with or without a camper shell also installed thereupon.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 2:
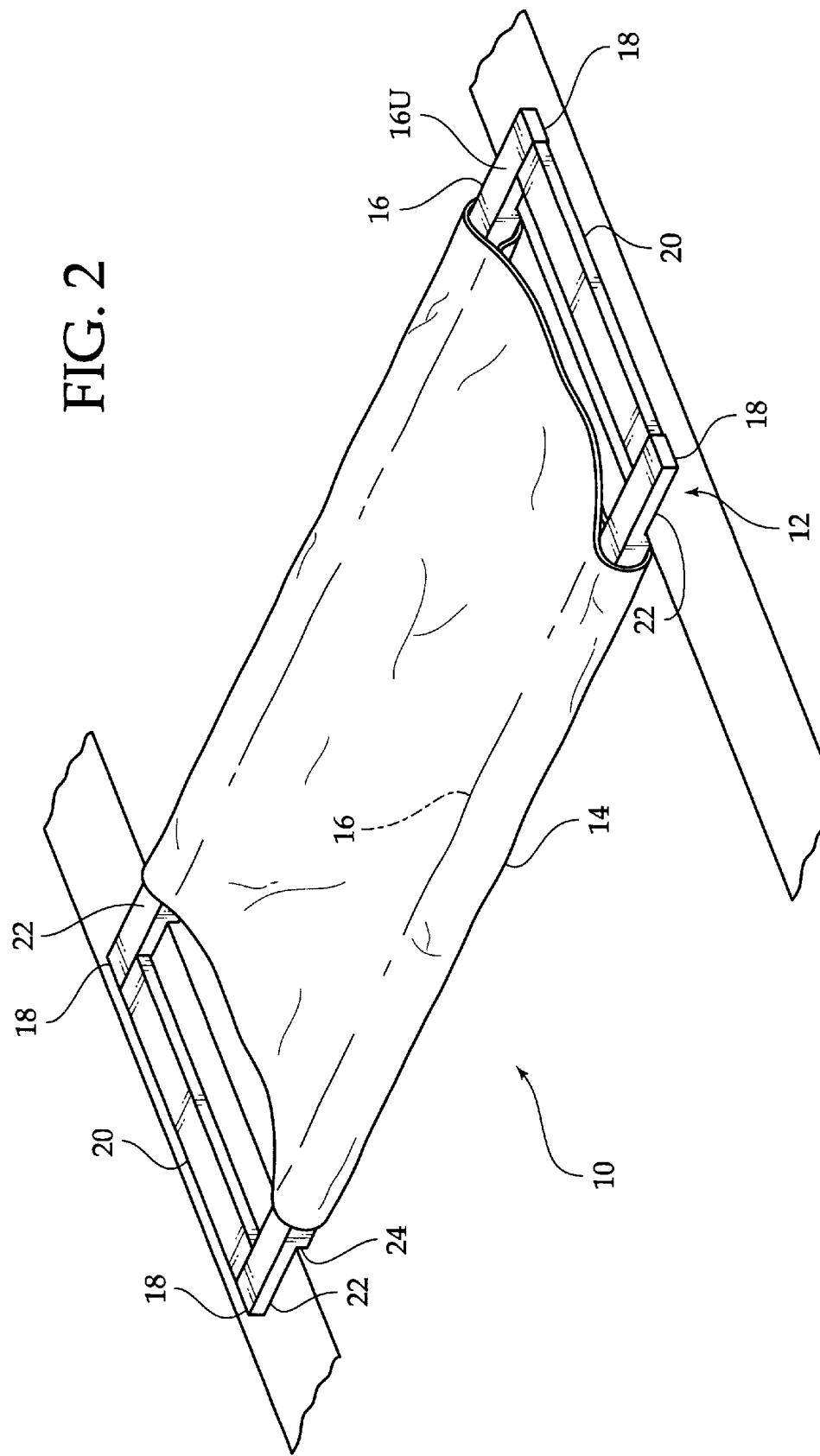
FIG. 2 is a diagrammatic perspective view, illustrating the invention fully assembled, and ready to use.

FIG. 2 illustrates a cot assembly 10, comprising a frame 12, and a fabric covering 14. The frame comprises two parallel main members 16. Each of the main members 16 have a pair of ends 18. Extending perpendicularly from one of the ends 18 of one of the main members 16 to one of the ends of the other main member 16 is a stabilizing support 20. The stabilizing support prevents the main members 16 from moving toward each other when a person's weight is upon the fabric covering 14.

Each of the main members 16 have an upper surface 16U. The upper surface 16U is substantially flat. It is especially important that the upper surface 16U is substantially flat near the ends 18 to allow the main members 16 to fit beneath a camper shell. At the ends 18, it is preferable that the main members have a flat indented portion 22. Each indented portion 22 has a vertical surface 24. The stabilizing supports 20 extend between the indented portions 22.

Figure 1:
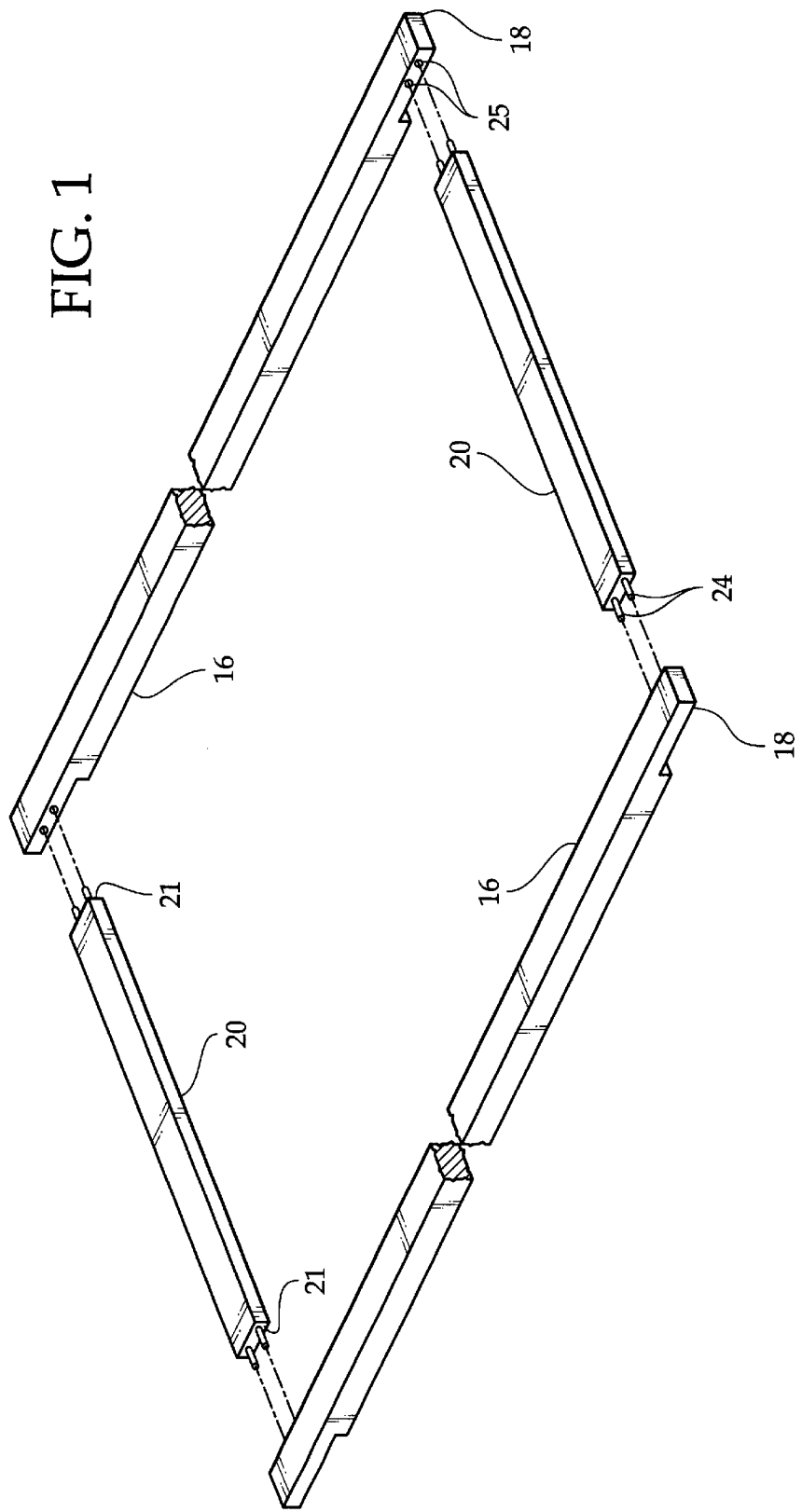
FIG. 1 is a diagrammatic perspective view, illustrating components of the frame of the present invention, including the parallel main members and the stabilizing supports.

FIG. 1 illustrates an embodiment of the invention, wherein the stabilizing supports 20 are rigidly attachable to the main members to provide a rigid framework. The stabilizing supports 20 each have a pair of opposite sides 21. Each side 21 of each stabilizing support 20 has at least one, and preferably two pins 24. Each end 18 of each main member 18, has matching holes 25 for accommodating the pins 24. When deploying the cot assembly 10, the stabilizing supports 20 are aligned with the main members 16 such that the pins 24 on the stabilizing supports 20 are aligned with the matching holes 25. By the preferred embodiment, wherein two pins 24 and two matching holes 25 are present at each stabilizing support side 21 and each main member end 18, a rigid framework is created, which resists various torsional forces.

In FIG. 1, the main members 16 are shown as having arbitrary length. If the main members 16 are constructed as shown, of solid materials, then the actual main member length should be selected to fit the truck bed that they are used with. However, it would be preferable to make the main members 16 telescoping, so that they can adjust to trucks of different sizes.

Figure 3:
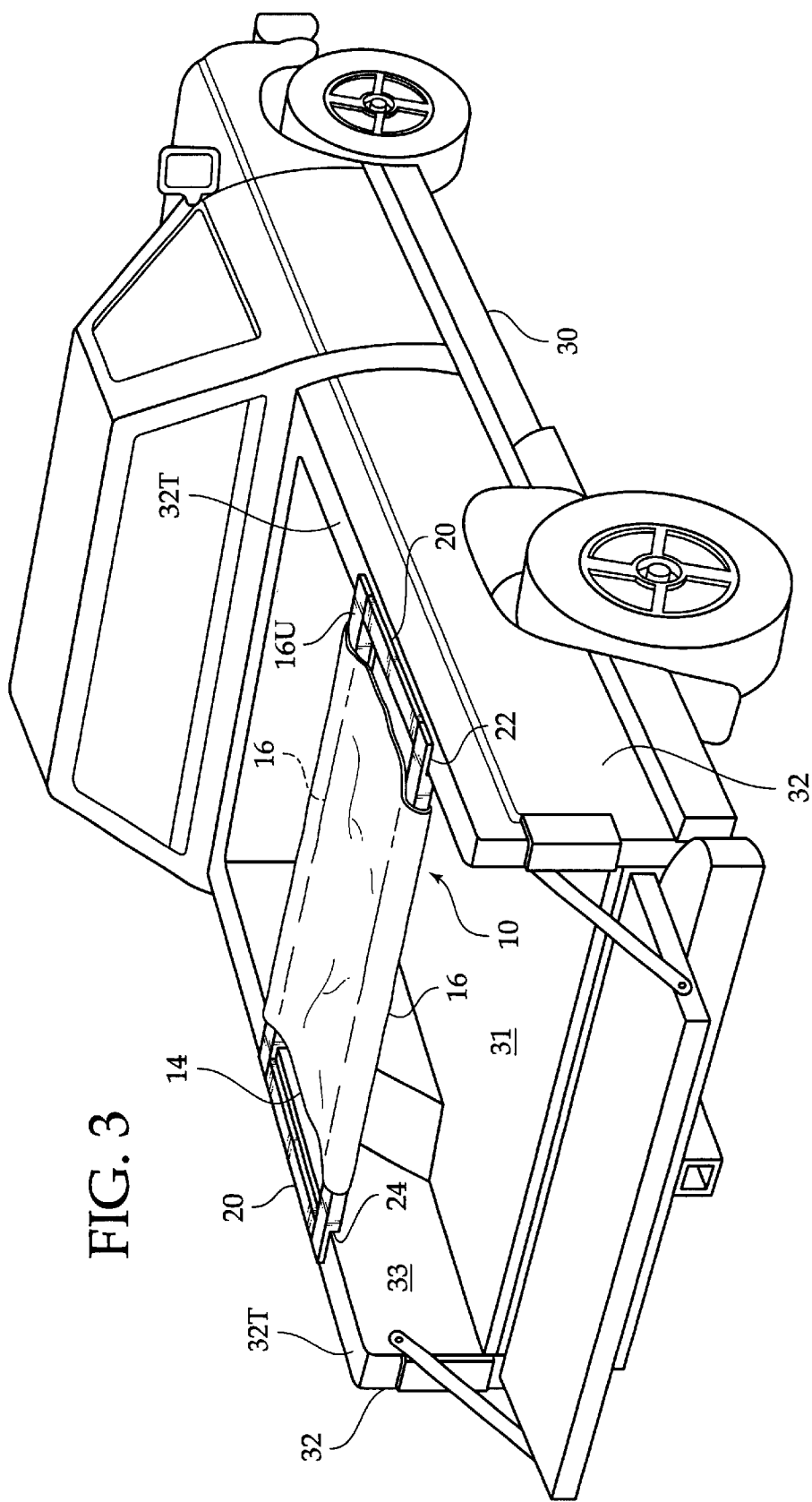
FIG. 3 is a diagrammatic perspective view, illustrating the invention mounted in place upon the bed sides of a pick-up truck.

FIG. 3 shows the cot system in use with a pick-up truck 30 having a bed 31 defined by a pair of parallel bed sides 32, wherein the cot assembly 10 is positioned across the bed 31, between the bed sides 32. It is important to note, that as defined herein, "bed sides" can refer to either longitudinal sides (extending from front to back), or transverse sides (extending across the truck). The bed sides 32 each have a bed side top 32T and a bed side inner wall 33. As illustrated, the main members 16 extend fully across the bed 31, wherein the main members 16 rest upon the bed side tops 32T. Also illustrated, the main members 16 are of such a length that the indented portions correspond to the position of the bed sides 32 such that the vertical surface 24 of each indented portion rests against the bed side inner wall 33.

In FIG. 3 it can be seen that the upper surface 16U of the indented portion 22 of the main members 16 is substantially flush with the stabilizing supports 20. In fact, it is important that the indented portion 22 and the stabilizing support have a low profile so that the cot assembly 10 does not interfere with a camper shell also resting upon the bed sides 32.

Once deployed in the position shown in FIG. 3, a person can comfortably sleep upon the fabric covering 14. The stabilizing supports 20 prevent the main members from sliding upon the bed sides 32 toward each other. The interaction between the indented portions 22 and the bed sides 32 prevent the main members 16 from moving at all.

Figure 4:
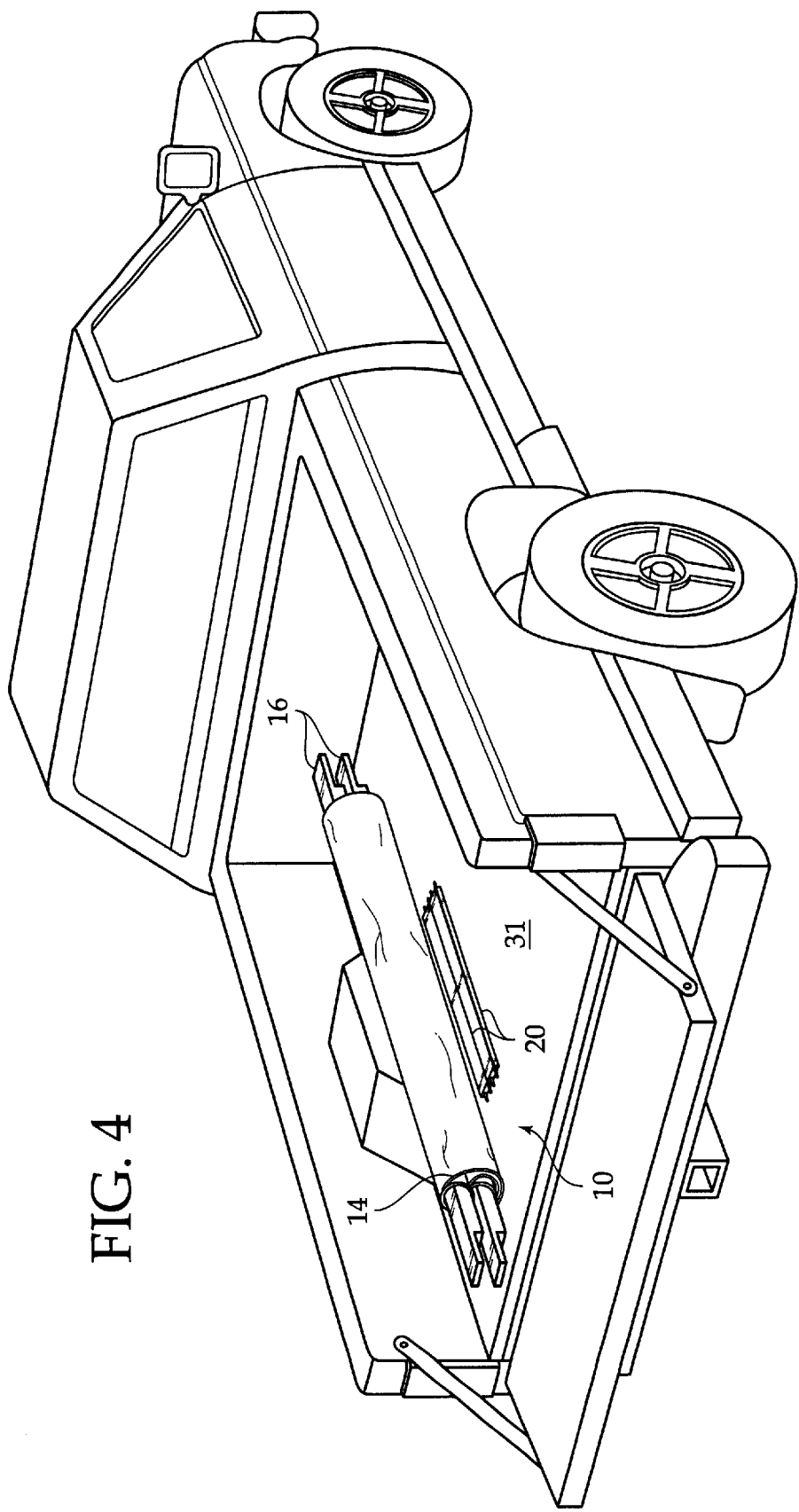
FIG. 4 is a diagrammatic perspective view, illustrating the invention being compactly stored on the truck bed.

FIG. 4 illustrates the cot assembly 10 dismantled for storage within the truck bed 31. As indicated, the stabilizing supports 20 have been removed from the main members 16. In addition, the main members and associated fabric covering 14 has been rolled up into a tight bundle, and the stabilizing supports 20 have been stacked neatly alongside. Of course, the stabilizing supports can be rolled up within the fabric covering 14 for truly compact storage.

The example shown for the cot assembly 10 provides a workable example of cot which is specifically configured safe use across the bed of a pick-up truck, resting upon the sides thereof, with or without a camper shell installed. However, many variations on this basic concept are possible, and are contemplated as being part of this invention.

What is claimed is:

1. A camper cot assembly, for use on a truck having a truck bed having bed sides defining the bed and extending upward therefrom, each bed side having a bed inner surface, comprising:

a pair of parallel main members each having two ends, the main members sized to extend fully between the bed sides with the ends thereof resting upon said bed sides, each main member has a pair of indented portions located at the ends thereof and an upper surface which is substantially flat, each indented portion has a vertical surface, and wherein the main members are configured such that the vertical surfaces rest against the inner surfaces of the bed sides when the main members extend between the bed sides;

a fabric covering extending between the main members for supporting a person laying upon said fabric covering; and a pair of stabilizing supports, extending between the main members at the ends of said main members, extending perpendicular to both of said main members, for preventing the ends of said main members from sliding toward each other when on the bed sides under the weight of the person laying upon the fabric covering.

2. A camper cot assembly, for use on a truck having a truck bed having bed sides defining the bed and extending upward therefrom, each bed side having a bed inner surface, comprising:

a pair of parallel main members each having two ends, the main members sized to extend fully between the bed sides with the ends thereof resting upon said bed sides, each main member has a pair of indented portions located at the ends thereof and an upper surface which is substantially flat, each indented portion has a vertical surface, and wherein the main members are configured such that the vertical surfaces rest against the inner surfaces of the bed sides when the main members extend between the bed sides;

a fabric covering extending between the main members for supporting a person laying upon said fabric covering; and a pair of stabilizing supports, extending between the main members at the ends of said main members, extending perpendicular to both of said main members, for preventing the ends of said main members from sliding toward each other when on the bed sides under the weight of the person laying upon the fabric covering, said stabilizing supports each having a pair of sides, wherein the stabilizing support sides each have at least one pin, and wherein each end of each main member has at least one matching hole, so that the pins from the stabilizing supports fit within the matching holes in the main members.

* * * * *